(12) United States Patent
Sole et al.

(10) Patent No.: US 12,038,799 B2
(45) Date of Patent: Jul. 16, 2024

(54) SYSTEM BASIS CHIP HAVING SELECTABLE POWER SEQUENCE CONFIGURATIONS, CORRESPONDING PROCESSING SYSTEM, DEVICE AND METHOD

(71) Applicant: STMICROELECTRONICS S.r.l., Agrate Brianza (IT)

(72) Inventors: Luigi Sole, Milan (IT); Rossella Gaudiano, Milan (IT); Marta Cantarini, Milan (IT); Nicola Errico, Rho (IT); Antonio Giordano, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/903,753

(22) Filed: Sep. 6, 2022

(65) Prior Publication Data

US 2023/0074929 A1    Mar. 9, 2023

(30) Foreign Application Priority Data

Sep. 9, 2021 (IT) .......................... 102021000023351

(51) Int. Cl.
    *G06F 1/32* (2019.01)
    *G06F 1/3206* (2019.01)
    *G06F 1/3296* (2019.01)

(52) U.S. Cl.
    CPC .......... *G06F 1/3206* (2013.01); *G06F 1/3296* (2013.01)

(58) Field of Classification Search
    None
    See application file for complete search history.

(56) References Cited

U.S. PATENT DOCUMENTS

| 9,350,245 | B2 | 5/2016 | Huynh et al. |
| 9,853,535 | B2* | 12/2017 | Chao ........................ H03H 7/40 |
| 2014/0313608 | A1* | 10/2014 | Nakabayashi ...... H02M 3/1584 |
| | | | 360/39 |
| 2016/0268884 | A1 | 9/2016 | Chao et al. |
| 2017/0126005 | A1 | 5/2017 | Elsayed et al. |

* cited by examiner

*Primary Examiner* — Nitin C Patel
(74) *Attorney, Agent, or Firm* — Seed IP Law Group LLP

(57) ABSTRACT

A system basis chip is described. The system basis chip comprises a power supply circuit configured to receive an input voltage and generate a plurality of voltages, and a control circuit. Specifically, the power supply circuit is configured to selectively switch on a first and a second voltage of the voltages as a function of a control signal. The control circuit measures a resistance value of an external resistor connected to a terminal and selects one of a plurality of configurations as a function of the measured resistance value, wherein a first configuration indicates that said first voltage should be switched on before said second voltage and a second configuration indicates that said second voltage should be switched on before said first voltage. Accordingly, the control circuit may generate the control signal in order to switch on in sequence the first and the second voltage according to the selected configuration.

31 Claims, 8 Drawing Sheets

| CFG | Rset | V | TH | Tol |
|---|---|---|---|---|
| CFG0 | 0 | 0 | | |
| CFG1 | 10000 | 0,15 | 0,075 | 50% |
| CFG2 | 20000 | 0,3 | 0,225 | 25% |
| CFG3 | 28500 | 0,4275 | 0,36375 | 15% |
| CFG4 | 41000 | 0,615 | 0,52125 | 15% |
| CFG5 | 58000 | 0,87 | 0,7425 | 15% |
| CFG6 | 84000 | 1,26 | 1,065 | 15% |
| CFG7 | 120000 | 1,8 | 1,53 | 15% |
| CFG8 | 170000 | 2,55 | 2,175 | 15% |
| CFG9 | ∞ | 3,3 | 2,805 | |

| CFG | CODE | Mux1 | Mux2 | Mux3 | 1 | 2 | 3 |
|---|---|---|---|---|---|---|---|
| CFG1 | 000 | D1 | A2 | E3 | REG1 | REG2 | - |
| CFG2 | 001 | B1 | D2 | E3 | REG2 | REG1 | - |
| CFG3 | 010 | C1 | C2 | D3 | REG3 | REG1 | REG2 |
| CFG4 | 011 | A1 | B2 | D3 | REG3 | REG2 | REG1 |
| CFG5 | 100 | D1 | C2 | A3 | REG1 | REG3 | REG2 |
| CFG6 | 101 | A1 | D2 | B3 | REG2 | REG3 | REG1 |
| CFG7 | 110 | B1 | D2 | C3 | REG2 | REG1 | REG3 |
| CFG8 | 111 | D1 | A2 | C3 | REG1 | REG2 | REG3 |

*FIG. 7*

SYSTEM BASIS CHIP HAVING SELECTABLE POWER SEQUENCE CONFIGURATIONS, CORRESPONDING PROCESSING SYSTEM, DEVICE AND METHOD

BACKGROUND

Technical Field

Embodiments of the present disclosure relate to processing systems, in particular processing systems comprising a system basis chip.

Description of the Related Art

FIG. 1 shows a typical electronic system 100, such as the electronic system of a vehicle, comprising a plurality of processing systems 10.

For example, in FIG. 1 are shown three processing systems 101, 102 and 103 connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit, a Transmission Control Unit (TCU), an Anti-lock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

FIG. 2 shows a block diagram of an exemplary digital processing system 10, which may be used as any of the processing systems 10 of FIG. 1.

Specifically, in the example considered, the processing system 10 comprises a microprocessor 102 programmed via software instructions. For example, the microprocessor 102 may be implemented in an integrated circuit, indicated as MCU, such as a micro-controller or a digital signal processor (DSP).

Usually, the software executed by the microprocessor 102 is stored in a non-volatile program memory 104, such as a Flash memory or EEPROM. Thus, the memory 104 is configured to store the firmware of the microprocessor 102, wherein the firmware includes the software instructions to be executed by the microprocessor 102.

The microprocessor 102 usually has associated also a volatile memory 104b, such as a Random-Access-Memory (RAM). For example, the memory 104b may be used to store temporary data.

As shown in FIG. 2, usually the communication with the memories 104 and/or 104b is performed via one or more memory controllers 100. The memory controller(s) 100 may be integrated in the microprocessor 102 or connected to the microprocessor 102 via a communication channel, such as a system bus of the processing system 10. Similarly, the memories 104 and/or 104b may be integrated with the microprocessor 102 in a single integrated circuit MCU, or the memories 104 and/or 104b may be in the form of a separate integrated circuit and connected to the microprocessor 102, e.g., via the traces of a printed circuit board.

In the example considered, the microprocessor 102 may have associated, e.g., integrated in the integrated circuit MCU, one or more (hardware) resources/peripherals 106 selected from the group of:

one or more communication interfaces, e.g., for exchanging data via the communication system 20, such as a Universal asynchronous receiver/transmitter (UART), a Serial Peripheral Interface Bus (SPI), an Inter-Integrated Circuit ($I^2C$), a Controller Area Network (CAN) bus, a Local Interconnect Network (LIN) and/or Ethernet interface, and/or a debug interface; and/or one or more analog-to-digital converters and/or digital-to-analog converters; and/or one or more dedicated digital components, such as hardware timers and/or counters, or a cryptographic co-processor; and/or one or more analog components, such as comparators, sensors, such as a temperature sensor, etc.; and/or one or more mixed signal components, such as a PWM (Pulse-Width Modulation) driver.

As shown in FIG. 2, the integrated circuit MCU of the microprocessor 102 usually receives one or more supply voltages $V_{core}$, which are used to supply the various circuits integrated in the integrated circuit MCU.

Accordingly, typically, the processing system 10 comprises a power supply circuit 300. For example, such a power supply circuit 300 may receive a supply voltage $V_{in}$, such as a DC voltage, e.g., provided by a battery, such as a vehicle battery, and generate the one or more supply voltages $V_{core}$ for the integrated circuit MCU. For example, the power supply circuit 300 may comprise for this purpose one or more voltage conversion circuits, such as linear regulators or switched mode electronic converters, such as flyback, buck or buck-boost converters.

Often the communication channel 20 uses voltage levels being different from the supply voltage $V_{core}$ of the microprocessor 102. For example, this is usually the case for a CAN, LIN or Ethernet communication channel 20.

Accordingly, in this case, the microprocessor 102 cannot directly exchange data via the communication channel 20, but an additional transceiver 304, such as a CAN bus transceiver, e.g., a CAN FD or CAN XL transceiver, a LIN transceiver or an Ethernet transceiver, is necessary in order to correctly transmit data via the communication channel 20.

Generally, the transceiver 304 may be integrated in the integrated circuit MCU of the microprocessor 102 or—as shown in FIG. 2—may be provided in an additional integrated circuit 30. For example, in the latter case, the integrated circuit MCU of the microprocessor 102 comprises a first communication interface 1060, which may be implemented with general-purpose input/outputs of the integrated circuit MCU or with a communication interface, such as an UART, SPI or $I^2C$ communication interface. Similarly, the integrated circuit 30 comprises a second communication interface 302 (being compatible with the first communication interface 1060), wherein the second communication interface 302 is configured to exchange data between the first communication interface 1060 and the transceiver 304, thereby transmitting and/or receiving data via the communication channel 20. Generally, the protocol management for the communication channel 20, such as the management of the CAN, LIN or Ethernet protocol, may be implemented in any suitable manner within the microprocessor 102, the communication interface 1060, the communication interface 302 and/or the transceiver 304.

Accordingly, in this case, the power supply circuit 300 may also generate one or more additional voltages, such as voltages $V_1$ and $V_2$, used to supply the communication interface 302 (which could also be supplied via the voltage $V_{core}$) and the transceiver 304, respectively.

Recently various chip producers, such as STMicroelectronics, NXP, Infineon or Texas Instruments, have commercialized integrated circuits 30, wherein the voltage supply circuit 300 is integrated (at least in part) directly within the integrated circuit 30, which in this case is usually called System Basis Chip (SBC). Generally, in case the power supply circuit 300 comprises one or more switched mode power supplies, respective capacitances and/or inductances may be provided externally with respect to the SBC 30.

Often such system basis chips 30 include also a plurality of transceivers, such as one or more CAN and/or LIN transceivers, and/or additional components 306, such as sensors and/or monitoring circuits, such as watchdog timers, configured to monitor the operation of the integrated circuit MCU and/or other circuits of the processing system 10. For example, such additional components 306 may be supplied by one or more further voltages $V_3$ generated by the power supply circuit 300.

For example, in this context may be cited the chip UJA1169A from NXP, the chip TCAN4550-Q1 from Texas Instruments or the chip L9788 from STMicroelectronics.

Moreover, as shown in FIG. 2, the processing system 10 may comprise in addition to the power supply circuit 300 also one or more additional power supply circuits 300b being external with respect to the integrated circuits MCU and 30. For example, this power supply circuit 300b may receive the voltage $V_{in}$, and may generate the core voltage $V_{core}$ of the integrated circuit MCU. In this case, the power supply circuit 300 may be configured to provide an enable signal EN used to selectively enable the power supply circuit 300b. Additionally or alternatively, the power supply circuit 300b may be configured to receive a pre-regulated voltage $V_{pre}$ from the power supply circuit 300 and generate the core voltage $V_{core}$ based on the pre-regulated voltage $V_{pre}$.

Thus, in general, the power supply circuit 300 may comprise a plurality of voltage conversion circuits/voltage regulators, such as linear regulators or switched mode electronic converts, such as buck or buck-boost converters. Generally, such power supply circuits 300 may also include a common pre-regulator, e.g., for the voltage $V_{pre}$, and various (post) voltage conversion circuits, e.g., in order to generate the voltages $V_1$, $V_2$ and/or $V_3$.

BRIEF SUMMARY

The inventors have observed that, in order to support different applications, it would be advantageously that the power-up sequence of the voltages generated by the power supply circuit 300 is configurable.

Moreover, not necessarily all of the sub-circuits of the SBC may indeed be used in the final application. For example, only a single CAN transceiver 304 may be used, even though the SBC comprises a plurality of (e.g., CAN and/or LIN) transceivers. Accordingly, in order to reduce power consumption, the SBC may be configured in order to permit that the various circuits of the SBC may be selectively switched on or off.

In view of the above, various embodiments of the present disclosure provide solutions for selectively switching on in sequence one or more of the voltage regulators of an SBC.

As mentioned before, various embodiments of the present disclosure relate to a system basis chip. Specifically, in various embodiments, the system basis chip comprises two input power supply terminals configured to receive an input voltage and one or more output power supply terminals configured to provide one or more voltages to circuits being external with respect to the system basis chip. In various embodiments, the system basis chip comprises also one or more circuits configured to be supplied by one or more further voltages.

In various embodiments, a power supply circuit of the system basis chip may thus be configured to receive the input voltage and generate the one or more voltages and the one or more further voltages. Specifically, in various embodiments, the power supply circuit is configured to selectively switch on at least a first and a second voltage of the one or more voltages and the one or more further voltages as a function of a control signal.

In various embodiments, the system basis chip comprises further a terminal configured to be connected to a resistor, and a control circuit In particular, the control circuit is configured to measure a resistance value of the resistor, select one of a plurality of configurations as a function of the measured resistance value, wherein a first configuration indicates that the first voltage should be switched on before the second voltage and a second configuration indicates that the second voltage should be switched on before the first voltage, and generate the control signal in order to switch on in sequence the first and the second voltage according to the selected configuration.

For example, for this purpose, the power supply circuit may comprise a first voltage regulator configured to generate the first voltage when a first enable signal is asserted, and a second voltage regulator configured to generate the second voltage when a second enable signal is asserted. Accordingly, the control signal may correspond to or at least comprise the first and the second enable signals. Additionally, the power supply circuit may also comprise a voltage regulator configured to provide a supply voltage for the control circuit, wherein the voltage regulator is switched on when the input voltage exceeds a given threshold.

In various embodiments, in order to generate the control signal, the control circuit may comprise a finite state machine configured to sequentially switch on the first and the second voltage as a function of a configuration signal indicating the selected configuration and at least one of: a timer signal, a first signal indicating whether the first voltage is below a first threshold and/or a second signal indicating whether the second voltage is below a second threshold.

For example, in order to measure the resistance value, the control circuit may comprise a current source configured to apply a current, preferably a constant current, to the terminal, and an analog-to-digital converter configured to generate a digital sample of the voltage at the terminal. Accordingly, the configuration signal may correspond to the digital sample or the control circuit may comprise a (digital) processing circuit configured to generate the configuration signal as a function of the digital sample. For example, the processing circuit may be configured to generate the configuration signal by comparing the digital sample with a plurality of digital thresholds, and/or by low-pass filtering the digital sample. Additionally or alternatively, the analog-to-digital converter may be configured to generate the digital sample by comparing the voltage at the terminal with a plurality of analog thresholds, wherein the analog thresholds preferably do not increase linearly, but, e.g., at least in part according to an exponential law.

In various embodiments, the power supply circuit is configured to selectively switch on a third voltage of the one or more voltages and the one or more further voltages as a function of the control signal. In this case, one or more configurations may indicate the sequence in which the first, second and third voltage should be switched on. Additionally or alternatively, one or more further configurations may indicate that the third voltage should not be switched on.

In an embodiment, a system basis chip comprises: a plurality of power terminals, which, in operation, receive and transmit power supply voltage signals; one or more functional circuits embedded into the system basis chip; power supply circuitry embedded into the system basis chip and coupled to the plurality of power terminals and to the one or more functional circuits, wherein the power supply circuitry, in operation, generates a plurality of power supply voltage signals from an input voltage signal, the plurality of power supply voltage signals respectively supplying power to a power terminal of the plurality of power terminals or to one of the one or more functional circuits; and power sequence control circuitry embedded into the system basis chip and coupled to the power supply circuitry, wherein the power sequence control circuitry, in operation: generates an indication of a value of a resistance; and selects one of a plurality of power sequence configurations based on the generated indication of the value of the resistance, the plurality of power sequence configurations including: a first power sequence configuration in which a first power supply voltage signal of the plurality of power supply voltage signals is switched on before a second power supply voltage signal of the plurality of the power supply voltage signals; and a second power sequence configuration in which the second power supply voltage signal is switched on before the first power supply voltage signal.

In an embodiment, a system comprises: an integrated circuit, including: a plurality of power terminals, which, in operation, transmit power signals; one or more functional circuits embedded into the integrated circuit; power supply circuitry embedded into the integrated circuit and coupled to the plurality of power terminals and to the one or more functional circuits, wherein the power supply circuitry, in operation, generates a plurality of power supply signals, the plurality of power supply signals respectively supplying power via a power terminal of the plurality of power terminals or to one of the one or more functional circuits; and power sequence control circuitry embedded into the integrated circuit and coupled to the power supply circuitry, wherein the power sequence control circuitry, in operation: generates an indication of a value of a resistance; and selects one of a plurality of power sequence configurations based on the generated indication of the value of the resistance, the plurality of power sequence configurations including: a first power sequence configuration in which a first power supply signal of the plurality of power supply signals is switched on before a second power supply signal of the plurality of the power supply signals; and a second power sequence configuration in which the second power supply signal is switched on before the first power supply signal; and a microprocessor coupled to one or more of the power terminals, wherein the microprocessor, in operation, receives one or more power signals of the plurality of power signals via the one or more power terminals.

In an embodiment, a device comprises: a communication system; and a plurality of processing systems coupled together by the communication system, each processing system of the plurality of processing systems including: an integrated circuit, having: a plurality of power terminals, which, in operation, transmit power signals; one or more functional circuits embedded into the integrated circuit; power supply circuitry embedded into the integrated circuit and coupled to the plurality of power terminals and to the one or more functional circuits, wherein the power supply circuitry, in operation, generates a plurality of power supply signals, the plurality of power supply signals respectively supplying power via a power terminal of the plurality of power terminals or to one of the one or more functional circuits; and power sequence control circuitry embedded into the integrated circuit and coupled to the power supply circuitry, wherein the power sequence control circuitry, in operation: generates an indication of a value of a resistance; and selects one of a plurality of power sequence configurations based on the generated indication of the value of the resistance, the plurality of power sequence configurations including: a first power sequence configuration in which a first power supply signal of the plurality of power supply signals is switched on before a second power supply signal of the plurality of the power supply signals; and a second power sequence configuration in which the second power supply signal is switched on before the first power supply signal; and a microprocessor coupled to one or more of the power terminals, wherein the microprocessor, in operation, receives one or more power signals of the plurality of power signals via the one or more power terminals.

In an embodiment, a method comprises: generating, using power supply circuitry embedded into a system basis chip, a plurality of power supply voltage signals from an input voltage signal, the plurality of power supply voltage signals respectively supplying power to a power terminal of a plurality of power terminals of the system basis chip or to one or more functional circuits embedded in the system basis chip; and controlling, using power sequence control circuitry embedded in the system basis chip, switching on of power supply voltage signals of the plurality of power supply voltage signals, wherein the controlling includes: generating an indication of a value of a resistance; and selecting one of a plurality of power sequence configurations based on the generated indication of the value of the resistance, the plurality of power sequence configurations including: a first power sequence configuration in which a first power supply voltage signal of the plurality of power supply voltage signals is switched on before a second power supply voltage signal of the plurality of the power supply voltage signals; and a second power sequence configuration in which the second power supply voltage signal is switched on before the first power supply voltage signal.

In an embodiment, a non-transitory computer-readable medium's contents cause a system basis chip to perform a method, the method comprising: generating, using power supply circuitry embedded into the system basis chip, a plurality of power supply voltage signals from an input voltage signal, the plurality of power supply voltage signals respectively supplying power to a power terminal of a plurality of power terminals of the system basis chip or to one or more functional circuits embedded in the system basis chip; and controlling, using power sequence control circuitry embedded in the system basis chip, switching on of power supply voltage signals of the plurality of power supply voltage signals, wherein the controlling includes: generating an indication of a value of a resistance; and selecting one of a plurality of power sequence configurations based on the generated indication of the value of the resistance, the plurality of power sequence configurations including: a first power sequence configuration in which a first power supply voltage signal of the plurality of power supply voltage signals is switched on before a second power supply voltage signal of the plurality of the power supply voltage signals; and a second power sequence configuration in which the second power supply voltage signal is switched on before the first power supply voltage signal.

BRIEF DESCRIPTION OF THE SEVERAL VIEWS OF THE DRAWINGS

Embodiments of the present disclosure will now be described with reference to the annexed drawings, which are provided purely by way of non-limiting example and in which:

FIG. 5 shows an embodiment of the control circuit of FIG. 3;

FIGS. 6 and 7 show embodiments of the operation of the control circuit of FIG. 5;

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
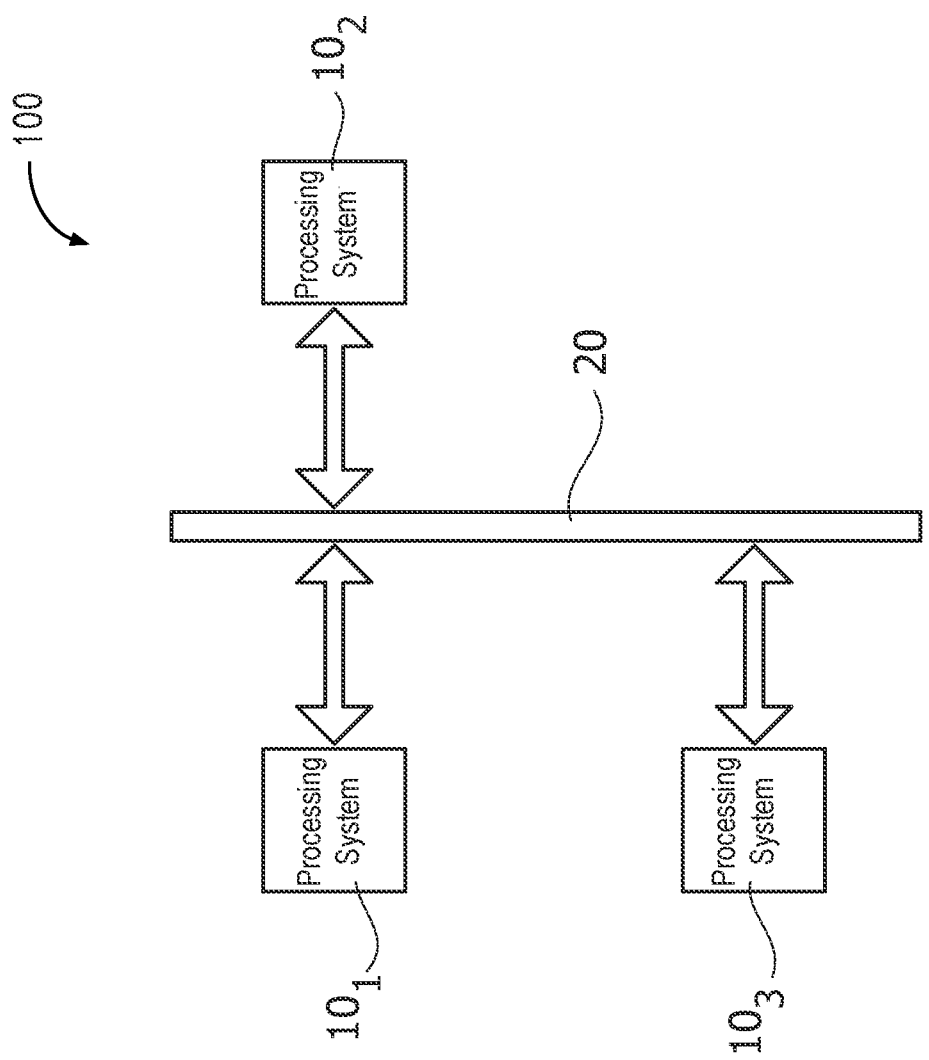
FIG. 1 shows an example of an electronic system comprising a plurality of processing systems.
Figure 2:
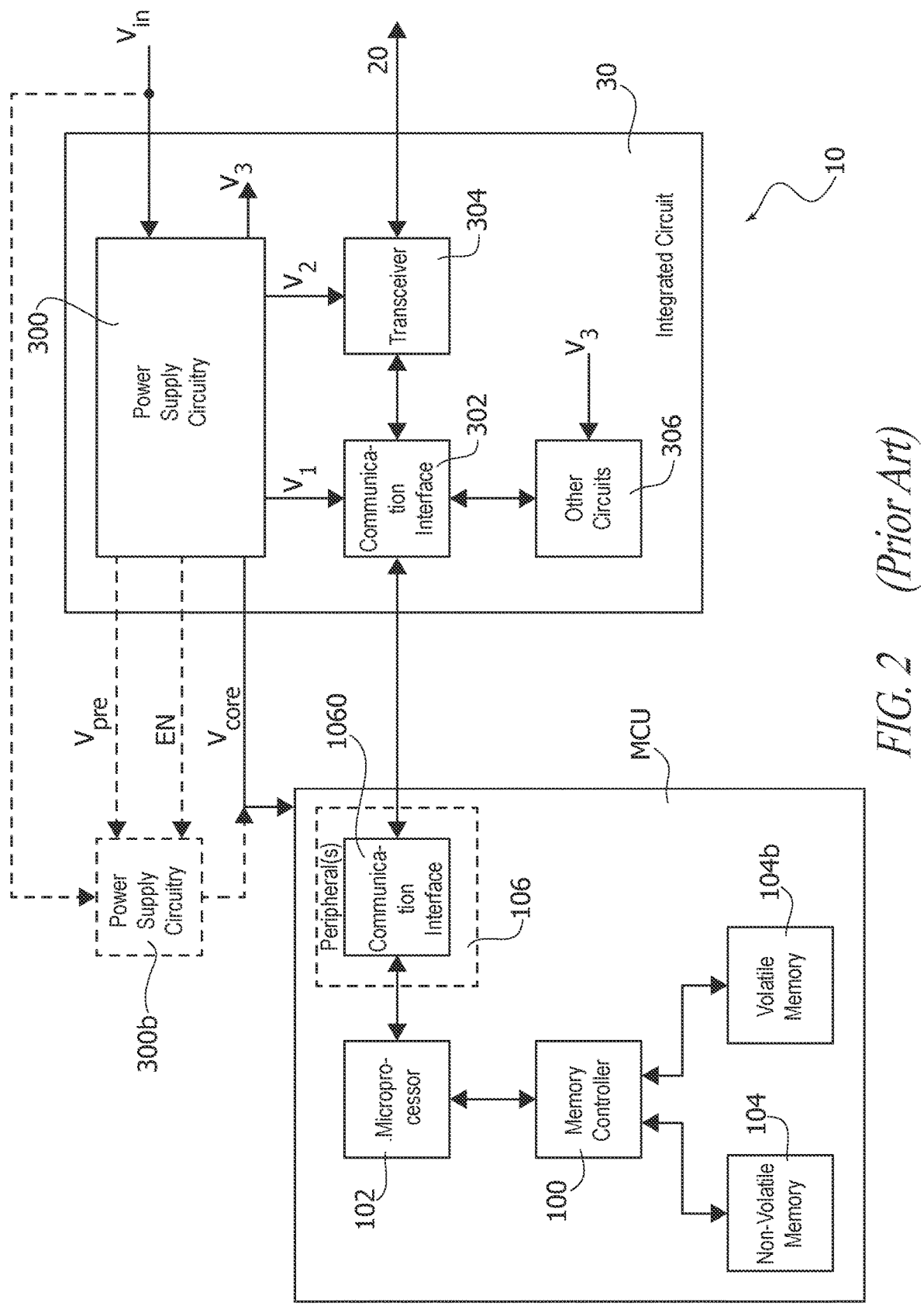
FIG. 2 shows an example of a processing system comprising a system basis chip.

In the following FIG. 3 to 9 parts, elements or components which have already been described with reference to FIGS. 1 to 2 are denoted by the same references previously used in such Figure; the description of such previously described elements will not be repeated in the following in order not to overburden the present detailed description.

As mentioned before, various embodiments of the present disclosure relate to solutions for selectively enabling or disabling the supply voltages generated by a power supply circuit of a system basis chip (SBC).

Figure 3:
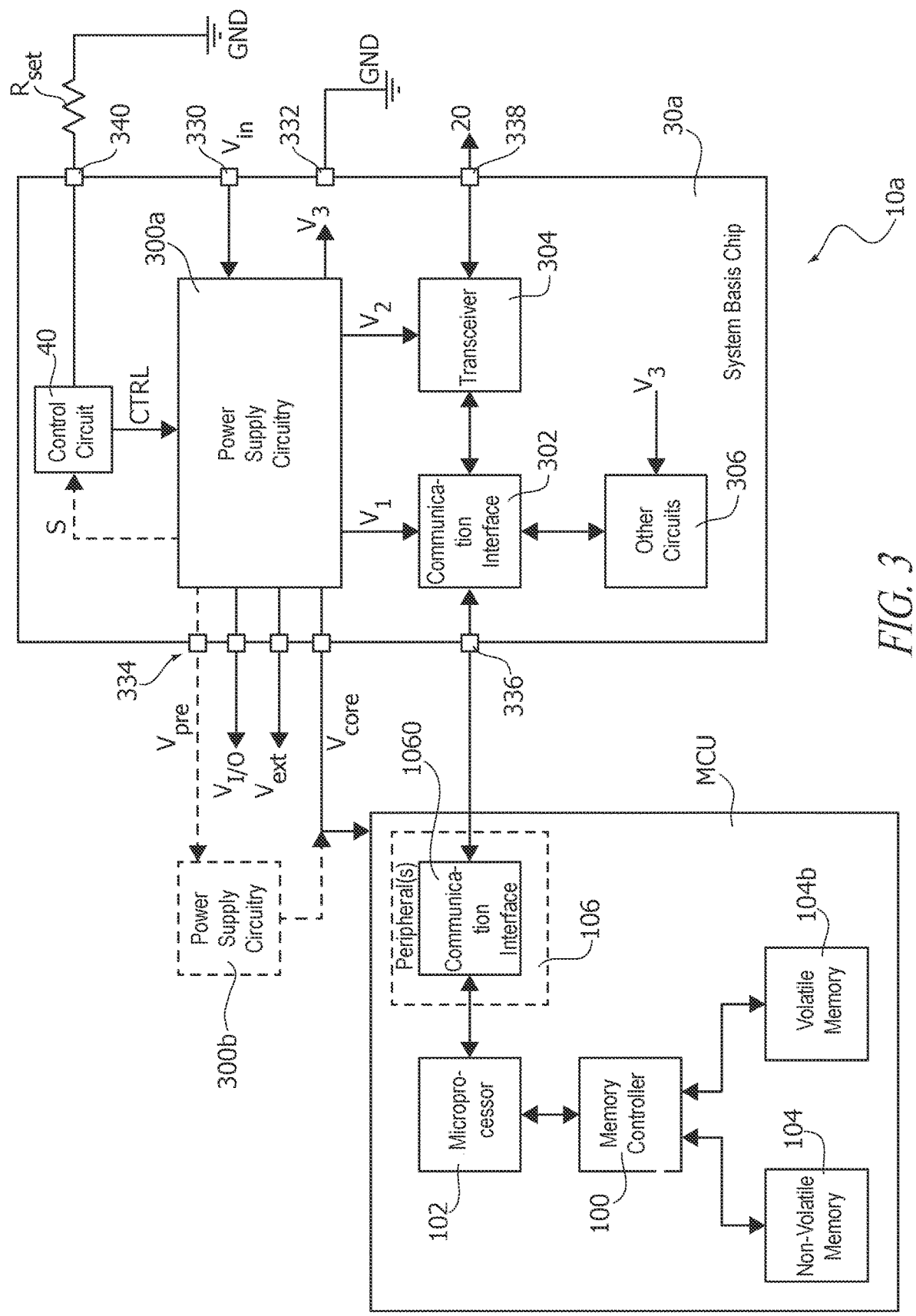
FIG. 3 shows an embodiment of a processing system according to the present disclosure, wherein the system basis chip comprises a power supply circuit and a control circuit for the power supply circuit.

FIG. 3 shows an embodiment of a processing system 10a according to the present disclosure, in particular of a respective system basis chip 30a. For a general description of such an SBC, reference may be made to the previous description of FIG. 2.

For example, in the embodiment considered, the integrated circuit/system basis chip 30a comprises the following terminals (pins or pads of the integrated circuit 30a):

two power supply terminals 330 and 332 for receiving an input voltage $V_{in}$, wherein the (negative) terminal 332 is configured to be connected to a ground GND; and one or more power supply terminals 334 configured to provide one or more voltages to circuits being external with respect to the SBC 30, wherein a power supply circuit 300a is configured to receive the voltage $V_{in}$ via the terminals 330 and 332 and generate the voltages at the terminals 334.

For example, the power supply circuit 300a may be configured to provide via the terminals 334 one or more of:

a pre-regulated voltage $V_{pre}$;

a core voltage $V_{core}$ adapted to be used to supply the core components of the microcontroller MCU (in particular the microprocessor 102 and the memory controller 100);

a further core voltage, indicated in the following as voltage $V_{I/O}$, adapted to be used to supply the input/output terminals of the microcontroller MCU; and one or more further voltages $V_{ext}$ adapted to be used to supply further (e.g., integrated) circuits of the processing system 10a.

In various embodiments, the power supply circuit 300a is configured to generate at the terminals 334 a plurality having different values, such as:

a first core voltage $V_{core1}$ having a first value, such as 3.3 V;

a second core voltage $V_{core2}$ having a second value being greater than the first core voltage $V_{core1}$, such as 5 V.

For example, in this way, different integrated circuits may be supplied via the SBC 30a, such as micro-controllers MCU using 5 V, 3.3 V or micro-controllers MCU with an additional power supply circuit 300b.

In various embodiments, the integrated circuit 30a comprises also the following terminals:

one or more terminals 336 configured to be connected to a microcontroller MCU, wherein a communication interfaces 302, such as an SPI interface, is configured to exchanging data via the one or more terminals 336; and optionally one or more terminals 338 configured to be connected to a communication channel 20 configured to connect a plurality of processing systems (see FIG. 1), wherein a transceiver 304, such as a CAN transceiver and optionally a CAN controller, is configured to exchange data between the communication interface 302 and the one or more terminals 338.

Accordingly, the power supply circuit 300a may be configured to generate also the supply voltages $V_1$ and/or $V_2$ for the interface(s) 302 and the transceiver(es) 304.

In various embodiments, the SBC 30a may also comprise one or more further circuits 306, such as sensors and/or monitoring circuits, which may exchange (analog and/or digital) data with the microcontroller MCU or another circuit of the processing system 10a, either directly via additional pins or pads of the SBC 30a or indirectly via a communication interface, such as the communication interface 302. Accordingly, the power supply circuit 300a may be configured to generate also one or more supply voltages $V_3$ for the additional components 306 of the SBC 30, such as one or more sensors.

As mentioned before, in various embodiments, the power supply circuit 300a is configured to selectively enable or disable one or more of the supply voltages generated by the power supply circuit 300a. For example, as mentioned before, in this way the supply voltages provided to unused circuits 304 and/or 306 of the SBC 30a may be switched off. Moreover, the power supply circuit 300a may be configured to disable/deactivate one or more of the voltages provided via the terminals 334. Thus, by selectively enabling and/or disabling one or more of the voltages generated by the power supply circuit 300a the same SBC 30a may be used for different application and power consumption may be reduced.

For example, the inventors have observed that the SBC 30a could comprise for this purpose a configuration register arranged to be programmable via the communication interface 302 (or another communication interface of the SBC 30a). In this case, the power supply circuit 300a could be configured to enable or disable one or more of the voltages generated by the power supply circuit 300a as a function of the data stored to the configuration register. For example, in this way, the microprocessor 102 may send commands to the communication interface 302 in order to selectively enable the power supply of the transceivers 304 and/or additional circuits 306.

However, the inventors have observed that such a software programmable management of the voltages generated by the power supply circuit 300a may not always be suitable. In fact, this implies that the core voltage $V_{core}$ has to be generated first and then the microprocessor 102 may manage the power-up/down sequence of the other voltages to best fit system level requirements.

However, the inventors have observed that in various applications that micro-controller MCU should not be switched on as first circuit.

For example, in case of an engine management system, the power supply circuit 300a may be configured to activate in sequence the following supply voltages, e.g., by switching on a respective voltage regulator:
1) the pre-regulated voltage $V_{pre}$;
2) the supply voltages $V_1$ and $V_2$ for the interface 302 and the transceiver 304, and optionally the voltage $V_{I/O}$ used to supply the input/output terminals of the microcontroller MCU;
3) the core voltage $V_{core}$ used to supply the core components of the microcontroller MCU (in particular the microprocessor 102 and the memory controller
4) one or more further voltages $V_{ext}$ used to supply further (e.g., integrated) circuits of the processing system; and
5) one or more supply voltages $V_3$ for the additional components 306 of the SBC 30a, such as one or more sensors.

Conversely, in case of a battery management system, the power supply circuit 300a may be configured to activate in sequence the following supply voltages:
1) the pre-regulated voltage $V_{pre}$, which in this case may be used to generate via an additional power supply circuit 300b the core voltage $V_{core}$ used to supply the core components of the microcontroller MCU;
2) optionally the core voltage $V_{I/O}$ used to supply the input/output terminals of the microcontroller MCU;
3) the supply voltages $V_1$ and $V_2$ for the interface 302 and the transceiver 304; and
4) one or more supply voltages $V_3$ for the additional components 306 of the SBC 30a.

Accordingly, in this case, the different start-up sequence is used and the core voltage $V_{core}$ is not used.

Finally, in case of a processing system configured as a control circuit of an (high-power) electronic converter, the power supply circuit 300a may be configured to activate in sequence the following supply voltages:
1) the pre-regulated voltage $V_{pre}$;
2) the core voltage $V_{core}$ used to supply the core components of the microcontroller MCU (or another control circuit of the electronic converter);
3) one or more further voltages $V_{ext}$ used to supply further (e.g., integrated) circuits of the processing system 10a, and optionally the core voltage $V_{I/O}$ used to supply the input/output terminals of the microcontroller MCU;
4) one or more supply voltages $V_3$ for the additional components 306 of the SBC 30a.

Accordingly, also in this case, a different start-up sequence is used and the supply voltages $V_1$ and $V_2$ for the interface 302 and the transceiver 304 may not be used.

Accordingly, the various final applications, such as EMS, TCU, braking, BMS, HEV, may require different power supplies and specific functions. In the past, this problem has been solved by providing a plurality of SBC, each designed for a different kind of applications with specific requirements for the defined application. However, by increasing the complexity of the SBC, e.g., in terms of number of interfaces 302, transceivers 304 and/or additional circuits 306, the design costs of the various SBC increase in order to mirror similar new functions also in the other SBC.

Accordingly, in order to develop only a single SBC 30a (or a limited number of SBC), it would be advantageously to provide a configurable SBC 30a, which integrates already most of the conventional functions, with the possibility to change the application target by configuring the functions needed for a specific application.

As mentioned before, the enabling/disabling of the various functions of the SBC 30a could be managed via one of more configuration registers programmable via the interface 302. However, this solution does not permit to specify also the power-up sequence of the SBC 30a, in particular with respect to the voltages generated by the power supply circuit 300a.

In various embodiments, the SBC 30a comprises thus a control circuit 40 configured to control the operation of the power supply circuit 300a. For this purpose, the control circuit 40 is configured to generate an (analog and/or digital) control signal CTRL for the power supply circuit 300a, i.e., the power supply circuit 300a is configured to activate in sequence a plurality of supply voltages, wherein the type of the supply voltages and/or the order of the supply voltages to be activated is determined as a function of the control signal CTRL.

Thus, in various embodiments, each of the various different sequences corresponds to a given configuration, wherein each configuration corresponds to a determined sequence of supply voltages to be generated by the power supply circuit 300a. Generally, the number of supply voltages of each sequence and the supply voltages included in each sequence may be different for the various sequences. For example, considering the previous examples, the control circuit 40 may be configured to support at least three configurations with the following sequences:
configuration 1: $V_{pre}$; $V_1$, $V_2$ and $V_{I/O}$; $V_{core}$; $V_{ext}$; $V_3$;
configuration 2: $V_{pre}$; $V_{I/O}$; $V_1$ and $V_2$; $V_3$; and
configuration 3: $V_{pre}$; $V_{core}$; $V_{ext}$ and $V_{I/O}$; $V_3$.

Generally, the control circuit 40 may not support necessarily all possible configurations, but only a subset of N possible configurations.

Moreover, some of the voltages generated by the power supply circuit 300a may always be generated at fixed positions. For example, the pre-regulated voltage $V_{pre}$ may be generated always as first supply voltage, e.g., in case the power supply circuit 300a uses this voltage $V_{pre}$ in order to generate the other voltages, and/or the voltage $V_3$ may always be generated as last voltage. Moreover, some of the voltages may always be generated together, e.g., the voltages $V_1$ and $V_2$.

Figure 4:
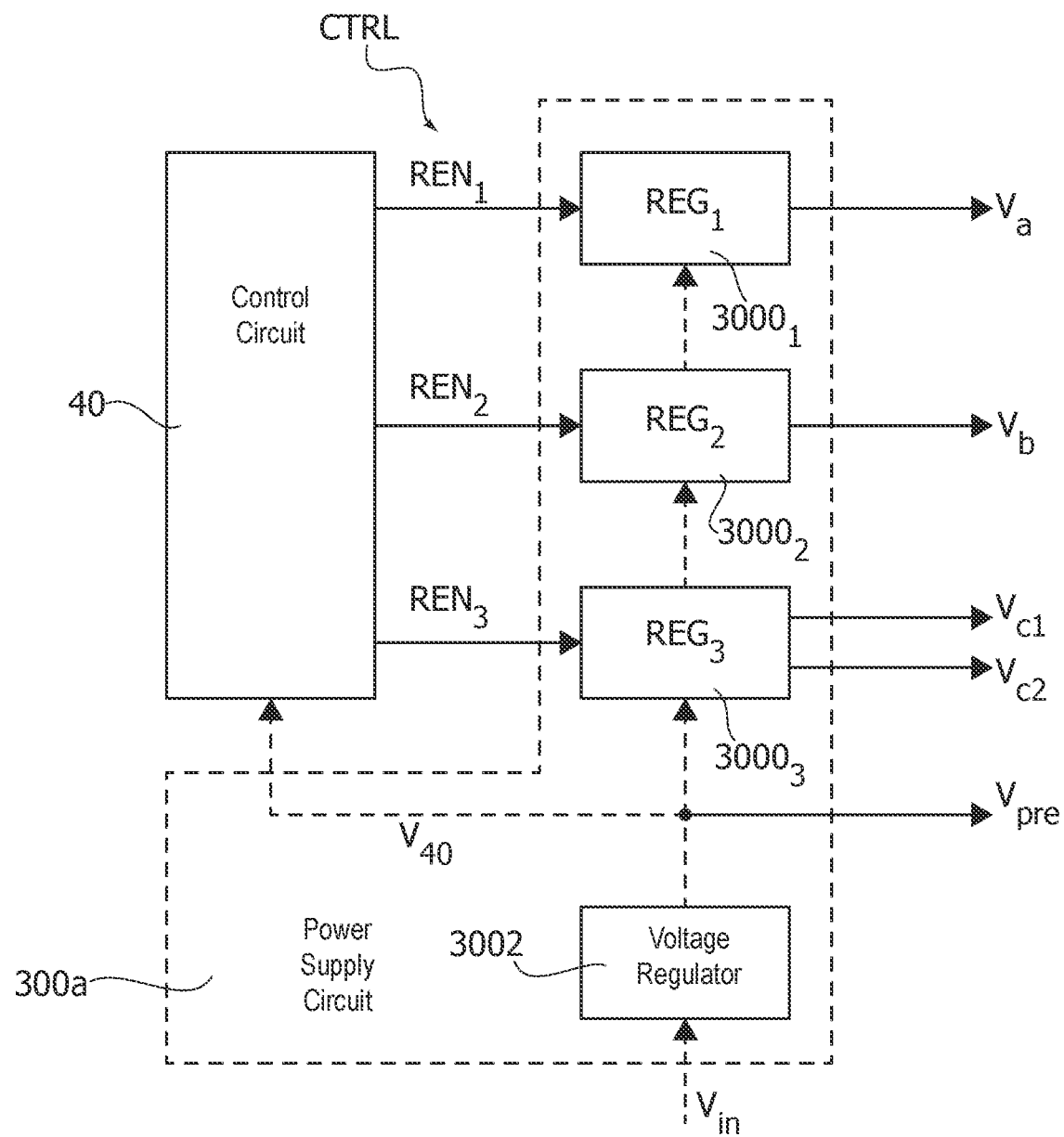
FIG. 4 shows an embodiment of the power supply circuit of FIG. 3.

For example, FIG. 4 shows an embodiment, wherein the power supply circuit 300a comprises a plurality of voltage regulators 3000, wherein each voltage regulator 3000 is configured to generate one or more respective voltages, such as the one or more voltages provided to the terminals 334 and/or one or more of the internal voltages. For example, in the embodiment considered are shown three voltage regulators $3000_1$, $3000_2$ and $3000_3$, also referred to regulators REG1, REG2 and REG3 in the following, wherein the voltage regulator $3000_1$ generates a voltage Va (e.g., corresponding to the core voltage $V_2$ for the transceiver 304), the voltage regulator $3000_2$ generates a voltage Vb (e.g., corresponding to the voltage $V_3$) and the voltage regulator $3000_3$ generates a voltage Vc1 and optionally a voltage Vc2 (e.g., corresponding to the voltages $V_{core}$ and $V_{I/O}$, respectively).

In the embodiment considered, each of the voltage regulators 3000 is configured to be enabled or disabled via a respective enable signal REN, such as enable signals $REN_1$, $REN_2$ and $REN_3$, which thus correspond to the previously mentioned control signal CTRL.

In the embodiment considered, the power supply circuit 300a comprises moreover a voltage regulator 3002. Specifically, compared to the regulators 3000, the voltage regulator 3002 is switched on automatically when the input voltages $V_{in}$ exceeds a given threshold voltage. Specifically, the voltage regulator 3002 is configured to receive the input voltage $V_{in}$ and generate a supply voltage $V_{40}$ for the control circuit 40. Optionally, the voltage regulator 3002 may also generate the pre-regulated voltage $V_{pre}$ and/or one or more further voltages, such as the voltage $V_1$ for the interface 302. Generally, the supply voltage $V_{40}$ for the control circuit 40 may also correspond to another voltage already generated by the regulator 3002, such as the pre-regulated voltage $V_{pre}$ or the voltage $V_1$.

Accordingly, the regulators 3000 may be powered directly via the input voltage $V_{in}$ or via the optional pre-regulated voltage $V_{pre}$ provided by the voltage regulator 3002.

For example, each of the voltage regulators 3000 and 3002 may be implemented with one or more linear regulators and/or switched mode electronic converters. Moreover, one or more components, such as inductances and/or capacitances of such switched mode electronic converters may be connected externally to the integrated circuit 30a. For example, in various embodiments, the pre-regulator of the circuit 3002 is implemented with a switched mode electronic converter, such as a buck converter, and the other regulators are implemented with linear regulators.

Accordingly, once the input voltage $V_{in}$ is applied to the SBC 30a, the control circuit 40 is switched on and the control circuit 40 may assert in sequence one or more of the enable signals REN according to a given selected configuration, thereby activating in sequence one or more of the voltages Va, Vb, Vc1 and optionally Vc2. For example, in a given selected configuration, the control circuit 40 may set the control signal CTRL=[RENa, RENb, RENc] initially to "000," thereby deactivating all voltage regulators 3000, and then set the control signal CTRL sequentially to the following bit-sequences:

"100," thereby activating only the voltage Va;
"110," thereby also activating the voltage Vb; and
"111," thereby also activating the voltages Vc1 and Vc2.

As mentioned before, the sequence of the values of the control signal CTRL generated by the control circuit 40 is determined according to a given selected configuration, indicated in the following as signal CODE. Accordingly, in various embodiments, the control circuit 40 is configured to determine, which of the N configurations should be used.

Figures 5, 6:
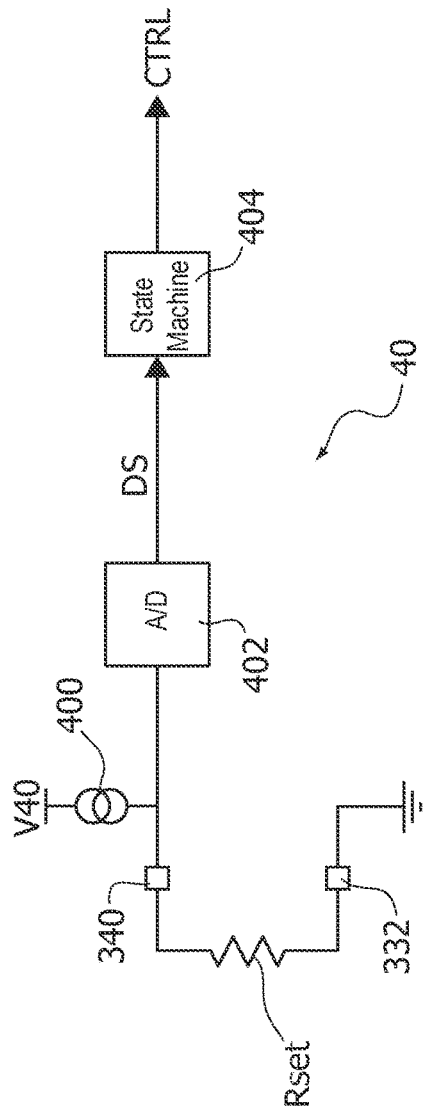

Specifically, in various embodiments, the configuration to be used is indicated via a set resistor $R_{set}$. Specifically, as shown in FIGS. 3 and 5, in this case, the SBC 30a comprises a pin/pad 340 configured to be connected to a resistor $R_{set}$, which is also connected to a reference voltage, such as ground GND/the terminal 332. Accordingly, in various embodiments, the control circuit 40 is configured to:
measure the resistance value of the resistor $R_{set}$,
select one of the N configurations as a function of the measured resistance value; and
generate sequentially the control signal CTRL in order to enable in sequence the voltage regulators 3000 according to the selected configuration.

For example, FIG. 5 shows an embodiment, wherein the control circuit 40 is configured to measure the resistance value of the resistor $R_{set}$ by applying via a current source 400 a (constant) measurement current to the terminal 340 and measuring via an analog-to-digital converter 402, such as a sigma-delta converter, the voltage V at the terminal 340 (e.g., with respect to ground GND/the terminal 332). Generally, instead of using a current source 400, also a simple reference resistor could be connected between the voltage $V_{40}$ and the terminal 340, thereby implementing a resistive voltage divider. Generally, also other circuits adapted to measure a resistance value may be used, e.g., possibly also comprising an operational amplifier.

Accordingly, in general, the analog-to-digital converter 402 provides a digital sample DS having a given number of bits, wherein the value of the sample DS is indicative of (and preferably proportional to) the resistance value of the resistor $R_{set}$, and thus indicates the configuration to be used In the embodiment considered, the sample DS is then provided to a circuit 404, such as a finite state machine, configured to generate the sequence of the control signal CTRL according to the selected configuration as indicated by the value of the sample DS.

For example, in various embodiments, the supply voltage $V_{40}$ corresponds to 3.3 V, the measurement current provided by the current source 400 corresponds to 15 uA (microampere), and N=10 possible configurations CFG0 . . . CFG9 may be identified.

FIG. 6 shows in this respect an embodiment of the mapping between the configurations CFG0 . . . CFG9 and possible nominal resistance values for the resistor $R_{set}$.

For example, the configuration CFG0 may be identified via a short-circuit, the resistance $R_{set}$ is zero. Conversely, the configuration CFG9 may be identified via an open circuit, the resistance $R_{set}$ is infinite. Conversely, as shown in FIG. 6, the other configurations may be mapped to intermediate resistance values $R_{set}$, such as 10,000Ω, 20,000Ω, etc. In fact, each of the resistance values $R_{set}$ will result in a respective voltage V between the terminals 340 and 332, which is then converted via the ADC 402 in a respective digital sample DS.

For example, for this purpose, a low-resolution ADC 402 (e.g., having between 4 and 6 bits) may compare the voltage V between the terminals 340 and 332 with a plurality of analog threshold values TH. For example, FIG. 6 shows an example of such thresholds TH for the resistance values $R_{set}$. Specifically, in the embodiment considered, each threshold TH is set to the value in the middle between the voltage values V associated with the two adjacent nominal resistance values $R_{set}$. Accordingly, in this case, the signal CODE may correspond to the sample DS generated by the ADC 402.

In various embodiments, the thresholds TH do not increase linearly but in order to provide a good tolerance Tol of the threshold TH with respect to the nominal voltage V and thus the nominal resistance value $R_{set}$. For example, in various embodiments, the nominal voltages V (and thus the threshold values TH) increases at least in part according to an exponential law.

Alternatively, also a high-resolution ADC 402 (e.g., having at least 8 bits) may be used, and the circuit 402 may generate the signal CODE by comparing the value of the sample DS with a plurality of digital threshold values. Also in this case, the digital threshold values (essentially corresponding to the digital value of the analog threshold TH) may increases at least in part according to an exponential law.

FIG. 7 shows in this respect a possible embodiment of the sequences of regulators 3000 which are activated for different configurations CFG. Specifically, in FIG. 7 are only shown the configurations CFG1 . . . CFG8, because the configurations CFG0 (short-circuit) and/or CFG9 (open load) may correspond to error conditions, in which the control circuit 40 does not activate any of the regulators 3000 or activates the regulators 3000 according to a determined sequence, such as a safe sequence.

Accordingly, in the embodiment considered, N=8 different power-on sequences may be specified. For example, in order to provide a good flexibility, all possible sequences for switching on consecutively all three voltage regulators 3000 are supported by the configurations CFG3 . . . CFG8. For example, in the configuration CFG3 the regulators 3000 are switched on in the following sequence REG3, REG1 and REG2, e.g., by generating in sequence the following control signals CTRL: "001," "101" and "111."

Conversely, in the embodiment considered, the remaining configurations CFG1 and CFG2 are used to activate only two regulators 3000, e.g., the regulators REG1 and REG3. For example, in the configuration CFG1 the regulators 3000 are switched on in the following sequence REG1 and REG2, e.g., by generating in sequence the following control signals CTRL: "100" and "110." For example, considering the embodiment shown in FIG. 4, the regulator REG3/$3000_c$ would remain switched off, whereby, e.g., the power supply circuit 300a does not generate the core voltage $V_{core}$ and, e.g., an external power supply 300b may be used to generate the core voltage $V_{core}$ based on the pre-regulated voltage $V_{pre}$.

In FIG. 7 are also shown possible bit-sequences for the signal CODE used to identify the selected configuration.

Figure 8:
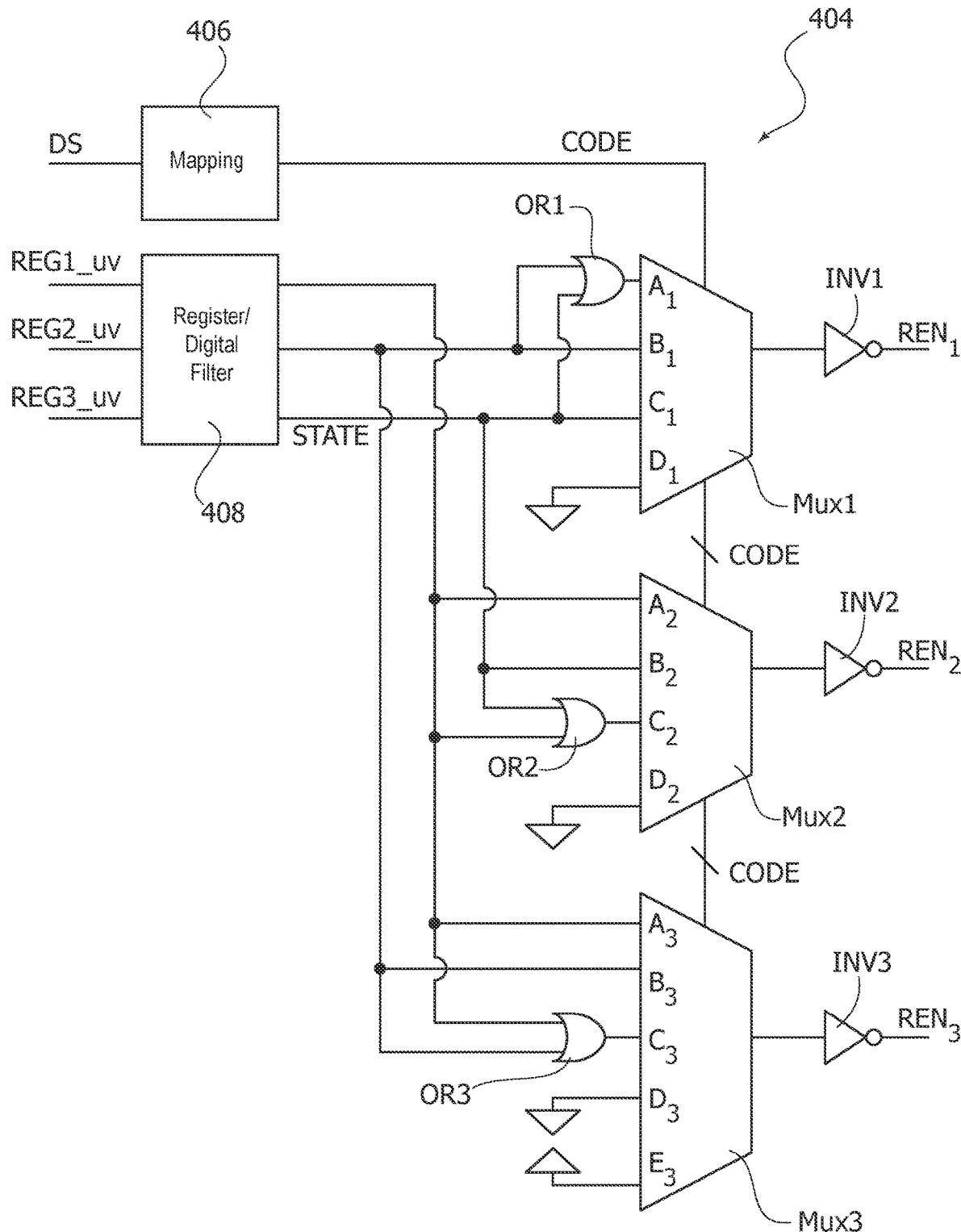
FIG. 8 shows an embodiment of a finite state machine of the control circuit of FIG. 3.

For example, as shown in FIG. 8, the circuit 404 may comprise a comparison or mapping circuit 406 configured to determine the signal CODE identifying the selected configuration as a function of the sample DS provided by the ADC 402, e.g., by comparing the sample DS with a plurality of digital threshold values, or in general the circuit 406 may be configured to map the signal DS to the signal CODE. In various embodiments, the circuit 406 may also implement other operations, such as a low-pass filtering of the signal DS and/or the signal CODE.

Generally, the circuit 406 is purely optional, because, as described in the foregoing, the signal CODE may also correspond directly to the sample DS. However, in this case, the circuit 406 may still be used to determine the signal CODE by performing a digital low-pass filtering of the signal DS.

In various embodiments, the circuit 404 may thus implement a finite state machine configured to generate the enable signals REN as a function of the signal CODE. Specifically, the advancement/transitions between the states of the state machine may be triggered via at least one of:

a timer signal, e.g., indicating that a given time has lapsed; and/or one or more measurement signals S provided by the power supply circuit 300a (see also FIG. 3) indicating that one or more of the regulators 3000 has been switched on.

For example, in FIG. 8 is shown an embodiment, wherein the circuit 404 receives from each regulator 3000 a respective signal indicating whether the voltages generated by the respective voltage regulator REG has been generated. For example, in FIG. 8 are used so called under-voltage signals, e.g., signals REG1_uv, REG2_uv and REG3_uv, indicating whether the voltage generated by the respective voltage regulator is below (e.g., the respective under-voltage signal is set to high) or above a given threshold voltage (e.g., the respective under-voltage signal is set to low).

Figure 9:
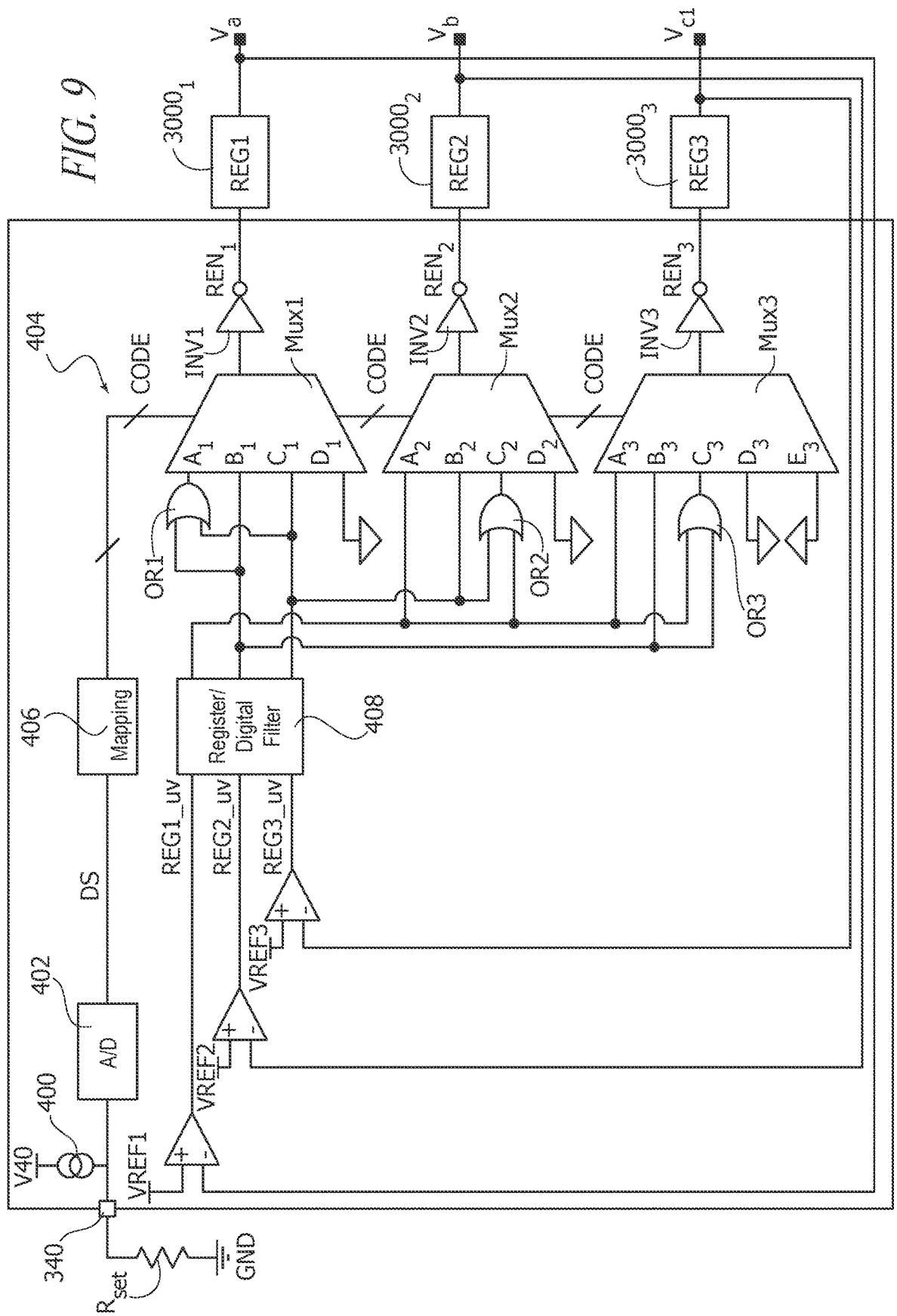
FIG. 9 shows an embodiment of the control circuit of FIG. 3.

For example, this is also shown in greater detail in FIG. 9, wherein each of the under-voltage signals REG1_uv, REG2_uv and REG3_uv, or a similar control signal, is determined by comparing the voltage (or at least one of the voltages) generated by the respective regulator 3000 with a respective threshold voltage VREF1, VREF2 and VREF3. Generally, the threshold voltage may be different for each of the voltages generated by the regulators 3000.

Accordingly, in the embodiment considered, the signals REG1_uv, REG2_uv and REG3_uv indicate the state STATE of the state machine. Generally, instead of using directly the signals REG1_uv, REG2_uv and REG3_uv as state signal STATE, the signals REG1_uv, REG2_uv and REG3_uv may also be stored to a register 408. The register 408 may also be replaced with a more complex circuit configured to generate the state signal STATE as a function of the signals REG1_uv, etc., e.g., a circuit configured to generate the state signal STATE by performing a digital low-pass filtering of each of the signals REG1_uv, etc. Moreover, as mentioned before, additionally or alternatively, the state signal STATE may also be determined by performing transitions between the states as a function of a timer signal, such as a trigger signal generated by a timer/counter circuit.

According, the circuit 404 may be configured to combine the state signal STATE via a combinational logic circuit with the signal CODE in order to generate the control signals CTRL.

For example, assuming that the state signal STATE has three bits, wherein each bit indicates whether a respective regulator 3000 is switched on, the logic functions of the combinational logic circuit may be determined in order to generate the signal CTRL by combining the state signal STATE with the selected configuration signal CODE.

For example, FIG. 8 shows an embodiment, wherein the each of the enable signals REN is provided by a respective multiplexer MUX, such as multiplexers MUX1, MUX2 and MUX3.

More specifically, in the embodiment considered, each enable signal is generated by inverting via a respective inverter, such as inverters INV1, INV2 and INV3, the signal provided by the respective multiplexer.

For example, considering the configuration CFG1, the regulator REG1 should be switched on first. For example, this may be obtained by providing at the output of the multiplexer MUX1 a logic "0," irrespective of the value of the state signal STATE. For example, in the embodiment considered, an input $D_1$ of the multiplexer MUX1 is connected to low for this purpose, wherein the input $D_1$ is selected, e.g., for the configuration CFG1 (CODE="000") or similarly the other configuration in which the regulator REG1 is switched on first, such as the configurations CFG5 and CFG8.

Similarly, the multiplexer MUX2 may comprise an input $D_2$ connected to low, wherein the input $D_2$ is selected for the configurations in which the regulator REG2 is switched on first, e.g., for the configuration CFG2 (CODE="001"), and the multiplexer MUX3 may comprise an input $D_3$ connected to low, wherein the input $D_3$ is selected for the configurations in which the regulator REG3 is switched on first, e.g., for the configuration CFG3 (CODE="010").

Moreover, due to the fact that the regulator REG3 may remain switched off in given configurations, the multiplexer MUX3 may comprise an input $E_3$ connected to high, wherein the input $E_3$ is selected for the configurations in which the regulator REG3 remains switched off, e.g., for the configurations CFG1 and CFG2. Those of skill in the art will appreciate that a similar input (connected to high) could also be added to the other multiplexers in order to maintain the regulators REG1 and/or REG2 switched off.

Conversely, the other combinations depend on the current value of the state signal STATE. For example, in the configuration CFG1, the regulator REG2 should be switched on once the regulator REG1 is switched on (as signaled via the signal REG1_uv and/or the timer signal). For example, for this purpose, the multiplexer MUX2 comprises an input $A_2$ which is set to low when the state signal STATE indicates that the regulator REG1 is switched on (e.g., the first bit of the state signal STATE is set to low).

For example, in the embodiment considered, in order to cover all possible combinations for activating a second voltage regulator:
  the multiplexer MUX1 comprises an input $B_1$ connected to the second bit of the state SIGNAL and an input $C_1$ connected to the third bit of the state SIGNAL;
  the multiplexer MUX2 comprises an input $A_2$ connected to the first bit of the state SIGNAL and an input $B_2$ connected to the third bit of the state SIGNAL; and
  the multiplexer MUX3 comprises an input $A_3$ connected to the first bit of the state SIGNAL and an input $B_3$ connected to the second bit of the state SIGNAL.

Finally, in order to activate the third regulator of a sequence, the combinational logic circuit has to verify whether the other two regulators are switched on (as signaled via the signals REG1_uv, etc., and/or the timer signal). For example, in the embodiment considered:
  the multiplexer MUX1 comprises an input $A_1$ being set to low when the second bit and the third bit of the state SIGNAL are set to low, as signaled, e.g., via a logic OR gate OR1;
  the multiplexer MUX2 comprises an input $C_2$ being set to low when the first bit and the third bit of the state SIGNAL are set to low, as signaled, e.g., via a logic OR gate OR2; and
  the multiplexer MUX3 comprises an input $C_3$ being set to low when the first bit and the second bit of the state SIGNAL are set to low, as signaled, e.g., via a logic OR gate OR3.

FIG. 7, shows in this respect a possible embodiment of the mapping between the configuration signal CODE and the selections to be performed by the multiplexers MUX1, MUX2 and MUX3.

Generally, the multiplexers and logic gates could also be implemented with any other combinational logic circuit configured to generate the enable signals REN as a function of the state signal STATE and the signal CODE.

Similarly, the state machines 404 may also be implemented differently. For example, the state circuit 408 could also use a plurality of different states, each associated with a different control signal, and the switching between the states could be based on the signal CODE and the under-voltage signals.

Moreover, as mentioned before, the state signal STATE could be determined based on a timer circuit. For example, in various embodiments, the state circuit 408 could correspond to a timer/counter circuit providing a given number of bits, which could also correspond to the most significant bits of a count value increased by the timer/counter circuit. For example, for the previous example, the state signal STATE may comprise two bits, which indicate:
  "00": none of the regulators 3000 should be switched on;
  "01": the first regulator 3000 of the sequence should be switched on;
  "10": also the second regulator 3000 of the sequence should be switched on;
  "11": also the third regulator 3000 of the sequence should be switched on (if used).

Accordingly, also in this case, the state signal STATE may be combined with the signal CODE, e.g., via a combinational logic circuit, in order to generate the various enable signals REN for the regulators 3000.

In various embodiments, the state circuit 408 may also combine both the timer circuit and the voltage feedback via the signals REG1_uv, etc., e.g., in order to determine whether a given regulator 3000 indeed has been switched on within a given maximum time, which thus permits to detect also a malfunctioning of the regulators 3000. For example, in various embodiments, the state signal STATE may correspond to a given number of bits (e.g., two bits) provided by the timer circuit and the various (filtered) signals REG1_uv, etc., which thus may be processed together with the signal CODE via a combinational logic circuit in order to generate the enable signals REN.

Consequently, in the previous embodiments, the system basis chip 30*a* comprises input power supply terminals 330 and 332 for receiving an input voltage $V_{in}$, and one or more output power supply terminals 334 for providing one or more voltages $V_{pre}$, $V_{core}$, $V_{I/O}$, $V_{ext}$ to circuits being external with respect to the system basis chip 30*a*. Moreover, the system basis chip 30*a* comprise one or more circuits 302, 304 and 306 supplied by one or more further voltages $V_1$, $V_2$, $V_3$. In the embodiments considered, the power supply circuit 300*a* receives the input voltage yin and generates the voltages and the further voltages. Specifically, the power supply circuit 300*a* is configured to selectively switch on (at least) a first Va and a second Vb voltage of the voltages and/or the further voltages as a function of a control signal CTRL.

According to various embodiments, the system basis chip 30*a* comprises a simple control circuit 40 configured to automatically select, based on the value of a resistance connected to the pin 340, the proper configuration in terms both of the power-up sequence and of the power-supply function used, e.g., the control circuit 40 measures a resistance value of the resistor $R_{set}$ and selects one of a plurality of configurations as a function of the measured resistance value. For example, in various embodiments, the control circuit 40 comprises a low-power current source 400, which provides a constant current to the pin 340, and the voltage drop generated by the resistance connected to the pin 340 is read via an internal ADC 402 and used to select a given configuration. In this respect, a simple state machine 404 may then control the power-up sequence based on the selected configuration CODE, e.g., by using an additional timer circuit and/or by monitoring the voltages generated by the power supply circuit.

For example, in various embodiments, a first configuration, e.g., CFG1, may indicate that the first voltage Va should be switched on before the second voltage Vb and a second configuration, e.g., CFG2, may indicate that the second voltage Vb should be switched on before the first voltage Va. Accordingly, the control circuit 40 may generate the control signal CTRL in order to switch on in sequence the first and the second voltage according to the selected configuration, i.e.:

in response to selecting the first configuration, switch on the first voltage Va and then switch on the second voltage Vb; and in response to selecting the second configuration, switch on the second voltage Vb and then switch on the first voltage Va.

Generally, the power supply circuit 300*a* may also generate a third voltage Vc and the configurations may also indicate when the third voltage should be switched on, and/or whether the first, second and/or third voltage should be switched on.

In various embodiments, once the voltages according to the selected configuration have been switched on (e.g., by using the timer circuit and/or by monitoring the voltages generated by the power supply circuit), the control circuit 40 may also switch off the current source 400 and/or the ADC 402 in order to reduce power consumption.

Of course, without prejudice to the principle of the disclosure, the details of construction and the embodiments may vary widely with respect to what has been described and illustrated herein purely by way of example, without thereby departing from the scope of the present disclosure.

A system basis chip (30*a*) may be summarized as including two input power supply terminals (330, 332) configured to receive an input voltage ($V_{in}$); one or more output power supply terminals (334) configured to provide one or more voltages ($V_{pre}$, $V_{core}$, $V_{I/O}$, $V_{ext}$) to circuits being external with respect to said system basis chip (30*a*); one or more circuits (302, 304, 306) configured to be supplied by one or more further voltages ($V_1$, $V_2$, $V_3$); and a power supply circuit (300*a*) configured to receive said input voltage ($V_{in}$) and generate said one or more voltages ($V_{pre}$, $V_{core}$, $V_{I/O}$, $V_{ext}$) and said one or more further voltages ($V_1$, $V_2$, $V_3$); wherein said power supply circuit (300*a*) is configured to selectively switch on a first (Va) and a second (Vb) voltage of said one or more voltages ($V_{pre}$, $V_{core}$, $V_{I/O}$, $V_{ext}$) and said one or more further voltages ($V_1$, $V_2$, $V_3$) as a function of a control signal (CTRL), and wherein said system basis chip (30*a*) may further include a terminal (340) configured to be connected to a resistor ($R_{set}$); and a control circuit (40) configured to measure a resistance value of said resistor ($R_{set}$), select one of a plurality of configurations as a function of said measured resistance value, wherein a first configuration (CFG1) indicates that said first voltage (Va) should be switched on before said second voltage (Vb) and a second configuration (CFG2) indicates that said second voltage (Vb) should be switched on before said first voltage (Va), and generate said control signal (CTRL) in order to switch on in sequence said first (Va) and said second (Vb) voltage according to the selected configuration (CODE).

Said power supply circuit (300*a*) may be configured to selectively switch on a third voltage (Vc1) of said one or more voltages ($V_{pre}$, $V_{core}$, $V_{I/O}$, $V_{ext}$) and said one or more further voltages ($V_1$, $V_2$, $V_3$) as a function of said control signal (CTRL), and a one or more configurations (CFG3 . . . CFG8) indicate the sequence in which said first (Va) second (Vb) and third (Vc1) voltage should be switched on.

One or more further configurations (CFG1, CFG2) may indicate that the third voltage (Vc1) should not be switched on.

Said control circuit (40) may include a finite state machine (404) configured to sequentially switch on said first (Va) and said second (Vb) voltage, and optionally said third voltage (Vc1), as a function of a configuration signal (CODE) indicating the selected configuration, and at least one of a timer signal (408), and a first signal (REG1_uv) indicating whether said first voltage (Va) may be below a first threshold and a second signal (REG2_uv) indicating whether said second voltage (Vb) is below a second threshold.

Said control circuit (40) may include a current source (400) configured to apply a current to said terminal (340); and an analog-to-digital converter (402) configured to generate a digital sample (DS) of the voltage at said terminal (340); wherein said configuration signal (CODE) corresponds to said digital sample (DS) or said control circuit (40) may include a processing circuit (406) configured to generate said configuration signal (CODE) as a function of said digital sample (DS).

Said processing circuit (406) may be configured to generate said configuration signal (CODE) by comparing said digital sample (DS) with a plurality of digital thresholds, and/or by low-pass filtering said digital sample (DS).

Said analog-to-digital converter (402) may be configured to generate said digital sample (DS) by comparing said voltage at said terminal (340) with a plurality of analog thresholds (TH).

Said analog thresholds (TH) may increase at least in part according to an exponential law.

Said power supply circuit (300*a*) may include a first voltage regulator (3000₁, REG1) configured to generate said first voltage (Va) when a first enable signal (RENT) may be asserted; and a second voltage regulator (3000₂, REG2) configured to generate said second voltage (Vb) when a second enable signal (REN₂) may be asserted; and said control signal (CTRL) may include said first (RENT) and said second (REN₂) enable signals.

Said power supply circuit (300*a*) may include a voltage regulator (3002) configured to provide a supply voltage ($V_{40}$) for said control circuit (40), wherein said voltage regulator (3002) may be switched on when the input voltage ($V_{in}$) exceeds a given threshold.

A processing system (10*a*) may be summarized as including a microprocessor (102) and a system basis chip (30*a*), wherein said microprocessor (102) is connected to one or more of said output power supply terminals (334).

A device, such as a vehicle, may be summarized as including a plurality of processing systems (10*a*), wherein said processing system (10*a*) are connected via a communication system (20).

A method of operating a system basis chip (30*a*) may be summarized as including connecting a resistor ($R_{set}$) to said terminal (340); switching on said system basis chip (30*a*), whereby the control circuit (40) of the system basis chip (30*a*): measures the resistance value of said resistor ($R_{set}$), selects one of a plurality of configurations as a function of said measured resistance value, and generate the control signal (CTRL) in order to switch on in sequence the first (Va) and the second (Vb) voltage according to the selected configuration (CODE).

In an embodiment, a system basis chip comprises: a plurality of power terminals, which, in operation, receive and transmit power supply voltage signals; one or more functional circuits embedded into the system basis chip; power supply circuitry embedded into the system basis chip and coupled to the plurality of power terminals and to the one or more functional circuits, wherein the power supply circuitry, in operation, generates a plurality of power supply voltage signals from an input voltage signal, the plurality of power supply voltage signals respectively supplying power to a power terminal of the plurality of power terminals or to one of the one or more functional circuits; and power sequence control circuitry embedded into the system basis chip and coupled to the power supply circuitry, wherein the power sequence control circuitry, in operation: generates an indication of a value of a resistance; and selects one of a plurality of power sequence configurations based on the generated indication of the value of the resistance, the plurality of power sequence configurations including: a first power sequence configuration in which a first power supply voltage signal of the plurality of power supply voltage signals is switched on before a second power supply voltage signal of the plurality of the power supply voltage signals; and a second power sequence configuration in which the second power supply voltage signal is switched on before the first power supply voltage signal.

In an embodiment, the system basis chip comprises a resistance terminal coupled to the power sequence control circuitry, wherein: the resistance terminal, in operation, couples to a resistor; and the power sequence control circuitry, in operation, generates the indication of the value of the resistance by sensing a value associated with the resistor. In an embodiment, the plurality of power supply voltage signals includes a third power supply voltage signal; and the plurality of power sequence configurations includes a power sequence configuration specifying a sequence of switching on the first, second and third power supply voltage signals. In an embodiment, the plurality of power supply voltage signals includes a third power supply voltage signal; and the plurality of power sequence configurations includes a power sequence configuration specifying the third power supply voltage signal should not be switched on. In an embodiment, the power sequence control circuitry comprises a finite state machine, which, in operation, generates control signals to sequentially switch on power supply voltage signals of the plurality of power supply voltage signals as a function of a configuration signal indicating the selected power sequence configuration. In an embodiment, the finite state machine, in operation, generates the control signals to sequentially switch on power supply voltage signals of the plurality of power supply voltage signals as a function of: a timer signal; a first signal indicating whether said first power supply voltage signal is below a first threshold; a second signal indicating whether said second power supply voltage signal is below a second threshold; or various combinations thereof. In an embodiment, the power sequence control circuitry comprises: a current source, which, in operation, supplies a current to the resistance terminal; and an analog-to-digital converter, which, in operation, generates a digital sample of the voltage at said terminal; wherein the control signals to sequentially switch on power supply voltage signals of the plurality of power supply voltage signal correspond to said digital sample or the power sequence control circuitry comprises sample processing circuitry, which, in operation, generates the control signals to sequentially switch on power supply voltage signals of the plurality of power supply voltage signals as a function of said digital sample. In an embodiment, said sample processing circuitry, in operation, generates said configuration signal by: comparing said digital sample with a plurality of digital thresholds; low-pass filtering said digital sample; or combinations thereof. In an embodiment, said analog-to-digital converter, in operation, generates the digital sample by comparing said voltage at said terminal with a plurality of threshold voltages. In an embodiment, said threshold voltages increase at least in part according to an exponential law. In an embodiment, the power supply circuitry comprises: a first voltage regulator, which, in operation, generates the first power supply voltage signal when a first enable signal is asserted; and a second voltage regulator, which, in operation, generates the second power supply voltage signal when a second enable signal is asserted, wherein the power sequence control circuitry, in operation, generates the first and said second enable signals based on the selected power sequence configuration. In an embodiment, the power supply circuitry comprises: a voltage regulator, which, in operation, provides a supply voltage to the power sequence control circuitry, wherein said voltage regulator, in operation, switches on in response to the input voltage exceeding a threshold voltage.

In an embodiment, a system comprises: an integrated circuit, including: a plurality of power terminals, which, in operation, transmit power signals; one or more functional circuits embedded into the integrated circuit; power supply circuitry embedded into the integrated circuit and coupled to the plurality of power terminals and to the one or more functional circuits, wherein the power supply circuitry, in operation, generates a plurality of power supply signals, the plurality of power supply signals respectively supplying power via a power terminal of the plurality of power terminals or to one of the one or more functional circuits; and power sequence control circuitry embedded into the integrated circuit and coupled to the power supply circuitry, wherein the power sequence control circuitry, in operation: generates an indication of a value of a resistance; and selects one of a plurality of power sequence configurations based on the generated indication of the value of the resistance, the plurality of power sequence configurations including: a first power sequence configuration in which a first power supply signal of the plurality of power supply signals is switched on before a second power supply signal of the plurality of the power supply signals; and a second power sequence configuration in which the second power supply signal is switched on before the first power supply signal; and a microprocessor coupled to one or more of the power terminals, wherein the microprocessor, in operation, receives one or more power signals of the plurality of power signals via the one or more power terminals.

In an embodiment, the system of comprises a resistor, wherein the integrated circuit comprises a resistance terminal coupled to the power sequence control circuitry and to the resistor; and the power sequence control circuitry, in operation, generates the indication of the value of the resistance by sensing a value associated with the resistor. In an embodiment, the power sequence control circuitry comprises a current source coupled to the resistance terminal and an analog-to-digital converter; and the analog-to-digital converter, in operation, senses a voltage on the resistance terminal. In an embodiment, the power supply circuitry comprises: a first voltage regulator, which, in operation, generates the first power supply voltage signal when a first enable signal is asserted; and a second voltage regulator, which, in operation, generates the second power supply voltage signal when a second enable signal is asserted, wherein the power sequence control circuitry, in operation, generates the first and said second enable signals based on the selected power sequence configuration. In an embodiment, the power supply circuitry comprises: a third voltage regulator, which, in operation, provides a supply voltage to the power sequence control circuitry, wherein said third voltage regulator, in operation, switches on in response to the input voltage exceeding a threshold voltage. In an embodiment, the power supply circuitry comprises: a voltage regulator, which, in operation, provides a supply voltage to the power sequence control circuitry, wherein said voltage regulator, in operation, switches on in response to the input voltage exceeding a threshold voltage.

In an embodiment, a device comprises: a communication system; and a plurality of processing systems coupled together by the communication system, each processing system of the plurality of processing systems including: an integrated circuit, having: a plurality of power terminals, which, in operation, transmit power signals; one or more functional circuits embedded into the integrated circuit; power supply circuitry embedded into the integrated circuit and coupled to the plurality of power terminals and to the one or more functional circuits, wherein the power supply circuitry, in operation, generates a plurality of power supply signals, the plurality of power supply signals respectively supplying power via a power terminal of the plurality of power terminals or to one of the one or more functional circuits; and power sequence control circuitry embedded into the integrated circuit and coupled to the power supply circuitry, wherein the power sequence control circuitry, in operation: generates an indication of a value of a resistance; and selects one of a plurality of power sequence configurations based on the generated indication of the value of the resistance, the plurality of power sequence configurations including: a first power sequence configuration in which a first power supply signal of the plurality of power supply signals is switched on before a second power supply signal of the plurality of the power supply signals; and a second power sequence configuration in which the second power supply signal is switched on before the first power supply signal; and a microprocessor coupled to one or more of the power terminals, wherein the microprocessor, in operation, receives one or more power signals of the plurality of power signals via the one or more power terminals. In an embodiment, the communication system includes a vehicle control bus.

In an embodiment, a method comprises: generating, using power supply circuitry embedded into a system basis chip, a plurality of power supply voltage signals from an input voltage signal, the plurality of power supply voltage signals respectively supplying power to a power terminal of a plurality of power terminals of the system basis chip or to one or more functional circuits embedded in the system basis chip; and controlling, using power sequence control circuitry embedded in the system basis chip, switching on of power supply voltage signals of the plurality of power supply voltage signals, wherein the controlling includes: generating an indication of a value of a resistance; and selecting one of a plurality of power sequence configurations based on the generated indication of the value of the resistance, the plurality of power sequence configurations including: a first power sequence configuration in which a first power supply voltage signal of the plurality of power supply voltage signals is switched on before a second power supply voltage signal of the plurality of the power supply voltage signals; and a second power sequence configuration in which the second power supply voltage signal is switched on before the first power supply voltage signal. In an embodiment, the method comprises: sensing a value associated with a resistor coupled to a resistance terminal of the system basis chip; and generating the indication of the value of the resistance based on the sensed value. In an embodiment, the plurality of power supply voltage signals includes a third power supply voltage signal; and the plurality of power sequence configurations includes a power sequence configuration specifying a sequence of switching on the first, second and third power supply voltage signals. In an embodiment, the plurality of power supply voltage signals includes a third power supply voltage signal; and the plurality of power sequence configurations includes a power sequence configuration specifying the third power supply voltage signal should not be switched on. In an embodiment, the method comprises: generating a configuration signal indicative of the selected power sequence configuration; and generating control signals to sequentially switch on power supply voltage signals of the plurality of power supply voltage signals as a function of a configuration signal indicating the selected power sequence configuration. In an embodiment, the control signals to sequentially switch on power supply voltage signals of the plurality of power supply voltage signals are generated as a function of: a timer signal; a first signal indicating whether said first power supply voltage signal is below a first threshold; a second signal indicating whether said second power supply voltage signal is below a second threshold; or various combinations thereof. In an embodiment, the method comprises: supplying a current to the resistance terminal; and generating a digital sample of a voltage at the resistance terminal, wherein the control signals to sequentially switch on power supply voltage signals of the plurality of power supply voltage signal correspond to the digital sample or are generated as a function of the digital sample. In an embodiment, the generating the configuration signal comprises: comparing the digital sample with a plurality of digital thresholds; low-pass filtering the digital sample; or combinations thereof.

In an embodiment, a non-transitory computer-readable medium's contents cause a system basis chip to perform a method, the method comprising: generating, using power supply circuitry embedded into the system basis chip, a plurality of power supply voltage signals from an input voltage signal, the plurality of power supply voltage signals respectively supplying power to a power terminal of a plurality of power terminals of the system basis chip or to one or more functional circuits embedded in the system basis chip; and controlling, using power sequence control circuitry embedded in the system basis chip, switching on of power supply voltage signals of the plurality of power supply voltage signals, wherein the controlling includes: generating an indication of a value of a resistance; and selecting one of a plurality of power sequence configurations based on the generated indication of the value of the resistance, the plurality of power sequence configurations including: a first power sequence configuration in which a first power supply voltage signal of the plurality of power supply voltage signals is switched on before a second power supply voltage signal of the plurality of the power supply voltage signals; and a second power sequence configuration in which the second power supply voltage signal is switched on before the first power supply voltage signal. In an embodiment, the method comprises: sensing a value associated with a resistor coupled to a resistance terminal of the system basis chip; and generating the indication of the value of the resistance based on the sensed value. In an embodiment, the contents comprise instructions executable by the power sequence control circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), state machines, field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system basis chip, comprising:
a plurality of power terminals, which, in operation, receive and transmit power supply voltage signals;
one or more functional circuits embedded into the system basis chip;
power supply circuitry embedded into the system basis chip and coupled to the plurality of power terminals and to the one or more functional circuits, wherein the power supply circuitry, in operation, generates a plurality of power supply voltage signals from an input voltage signal, the plurality of power supply voltage signals respectively supplying power to a power terminal of the plurality of power terminals or to one of the one or more functional circuits; and
power sequence control circuitry embedded into the system basis chip and coupled to the power supply circuitry, wherein the power sequence control circuitry, in operation:
generates an indication of a value of a resistance; and
selects one of a plurality of power sequence configurations based on the generated indication of the value of the resistance, the plurality of power sequence configurations including:
a first power sequence configuration in which a first power supply voltage signal of the plurality of power supply voltage signals is switched on before a second power supply voltage signal of the plurality of the power supply voltage signals; and
a second power sequence configuration in which the second power supply voltage signal is switched on before the first power supply voltage signal.

2. The system basis chip of claim 1, comprising a resistance terminal coupled to the power sequence control circuitry, wherein:
the resistance terminal, in operation, couples to a resistor; and
the power sequence control circuitry, in operation, generates the indication of the value of the resistance by sensing a value associated with the resistor.

3. The system basis chip according to claim 1, wherein:
the plurality of power supply voltage signals includes a third power supply voltage signal; and
the plurality of power sequence configurations includes a power sequence configuration specifying a sequence of switching on the first, second and third power supply voltage signals.

4. The system basis chip according to claim 1, wherein:
the plurality of power supply voltage signals includes a third power supply voltage signal; and
the plurality of power sequence configurations includes a power sequence configuration specifying the third power supply voltage signal should not be switched on.

5. The system basis chip according to claim 2, wherein the power sequence control circuitry comprises a finite state machine, which, in operation, generates control signals to sequentially switch on power supply voltage signals of the plurality of power supply voltage signals as a function of a configuration signal indicating the selected power sequence configuration.

6. The system basis chip according to claim 5, wherein the finite state machine, in operation, generates the control signals to sequentially switch on power supply voltage signals of the plurality of power supply voltage signals as a function of:
a timer signal;
a first signal indicating whether the first power supply voltage signal is below a first threshold;
a second signal indicating whether the second power supply voltage signal is below a second threshold; or
various combinations thereof.

7. The system basis chip according to claim 5, wherein the power sequence control circuitry comprises:
a current source, which, in operation, supplies a current to the resistance terminal; and
an analog-to-digital converter, which, in operation, generates a digital sample of the voltage at the terminal,
wherein the control signals to sequentially switch on power supply voltage signals of the plurality of power supply voltage signals correspond to the digital sample or the power sequence control circuitry comprises sample processing circuitry, which, in operation, generates the control signals to sequentially switch on power supply voltage signals of the plurality of power supply voltage signals as a function of the digital sample.

8. The system basis chip according to claim 7, wherein the sample processing circuitry, in operation, generates the configuration signal by:
comparing the digital sample with a plurality of digital thresholds;
low-pass filtering the digital sample; or
combinations thereof.

9. The system basis chip according to claim 7, wherein the analog-to-digital converter, in operation, generates the digital sample by comparing the voltage at the terminal with a plurality of threshold voltages.

10. The system basis chip according to claim 9, wherein the threshold voltages increase at least in part according to an exponential law.

11. The system basis chip according to claim 1, wherein the power supply circuitry comprises:
   a first voltage regulator, which, in operation, generates the first power supply voltage signal when a first enable signal is asserted; and
   a second voltage regulator, which, in operation, generates the second power supply voltage signal when a second enable signal is asserted, wherein the power sequence control circuitry, in operation, generates the first and the second enable signals based on the selected power sequence configuration.

12. The system basis chip according to claim 1, wherein the power supply circuitry comprises:
   a voltage regulator, which, in operation, provides a supply voltage to the power sequence control circuitry, wherein the voltage regulator, in operation, switches on in response to the input voltage exceeding a threshold voltage.

13. A system, comprising:
   an integrated circuit, including:
      a plurality of power terminals, which, in operation, transmit power signals;
      one or more functional circuits embedded into the integrated circuit;
      power supply circuitry embedded into the integrated circuit and coupled to the plurality of power terminals and to the one or more functional circuits, wherein the power supply circuitry, in operation, generates a plurality of power supply signals, the plurality of power supply signals respectively supplying power via a power terminal of the plurality of power terminals or to one of the one or more functional circuits; and
      power sequence control circuitry embedded into the integrated circuit and coupled to the power supply circuitry, wherein the power sequence control circuitry, in operation:
         generates an indication of a value of a resistance; and
         selects one of a plurality of power sequence configurations based on the generated indication of the value of the resistance, the plurality of power sequence configurations including:
            a first power sequence configuration in which a first power supply signal of the plurality of power supply signals is switched on before a second power supply signal of the plurality of the power supply signals; and
            a second power sequence configuration in which the second power supply signal is switched on before the first power supply signal; and
   a microprocessor coupled to one or more of the power terminals, wherein the microprocessor, in operation, receives one or more power signals of the plurality of power signals via the one or more power terminals.

14. The system of claim 13, comprising a resistor, wherein the integrated circuit comprises a resistance terminal coupled to the power sequence control circuitry and to the resistor, and the power sequence control circuitry, in operation, generates the indication of the value of the resistance by sensing a value associated with the resistor.

15. The system of claim 14, wherein
   the power sequence control circuitry comprises a current source coupled to the resistance terminal and an analog-to-digital converter, and
   the analog-to-digital converter, in operation, senses a voltage on the resistance terminal.

16. The system according to claim 13, wherein the power supply circuitry comprises:
   a first voltage regulator, which, in operation, generates the first power supply signal when a first enable signal is asserted; and
   a second voltage regulator, which, in operation, generates the second power supply signal when a second enable signal is asserted, wherein the power sequence control circuitry, in operation, generates the first and the second enable signals based on the selected power sequence configuration.

17. The system according to claim 16, wherein the power supply circuitry comprises:
   a third voltage regulator, which, in operation, provides a supply voltage to the power sequence control circuitry, wherein the third voltage regulator, in operation, switches on in response to the input voltage exceeding a threshold voltage.

18. The system according to claim 13, wherein the power supply circuitry comprises:
   a voltage regulator, which, in operation, provides a supply voltage to the power sequence control circuitry, wherein the voltage regulator, in operation, switches on in response to the input voltage exceeding a threshold voltage.

19. A device, comprising:
   a communication system; and
   a plurality of processing systems coupled together by the communication system, each processing system of the plurality of processing systems including:
      an integrated circuit, having:
         a plurality of power terminals, which, in operation, transmit power signals;
         one or more functional circuits embedded into the integrated circuit;
         power supply circuitry embedded into the integrated circuit and coupled to the plurality of power terminals and to the one or more functional circuits, wherein the power supply circuitry, in operation, generates a plurality of power supply signals, the plurality of power supply signals respectively supplying power via a power terminal of the plurality of power terminals or to one of the one or more functional circuits; and
         power sequence control circuitry embedded into the integrated circuit and coupled to the power supply circuitry, wherein the power sequence control circuitry, in operation:
            generates an indication of a value of a resistance; and
            selects one of a plurality of power sequence configurations based on the generated indication of the value of the resistance, the plurality of power sequence configurations including:
               a first power sequence configuration in which a first power supply signal of the plurality of power supply signals is switched on before a second power supply signal of the plurality of the power supply signals; and
a second power sequence configuration in which the second power supply signal is switched on before the first power supply signal; and
a microprocessor coupled to one or more of the power terminals, wherein the microprocessor, in operation, receives one or more power signals of the plurality of power signals via the one or more power terminals.

20. The device of claim 19, wherein the communication system includes a vehicle control bus.

21. A method, comprising:
generating, using power supply circuitry embedded into a system basis chip, a plurality of power supply voltage signals from an input voltage signal, the plurality of power supply voltage signals respectively supplying power to a power terminal of a plurality of power terminals of the system basis chip or to one or more functional circuits embedded in the system basis chip; and
controlling, using power sequence control circuitry embedded in the system basis chip, switching on of power supply voltage signals of the plurality of power supply voltage signals, wherein the controlling includes:
generating an indication of a value of a resistance; and
selecting one of a plurality of power sequence configurations based on the generated indication of the value of the resistance, the plurality of power sequence configurations including:
a first power sequence configuration in which a first power supply voltage signal of the plurality of power supply voltage signals is switched on before a second power supply voltage signal of the plurality of the power supply voltage signals; and
a second power sequence configuration in which the second power supply voltage signal is switched on before the first power supply voltage signal.

22. The method of claim 21, comprising:
sensing a value associated with a resistor coupled to a resistance terminal of the system basis chip; and
generating the indication of the value of the resistance based on the sensed value.

23. The method according to claim 21, wherein:
the plurality of power supply voltage signals includes a third power supply voltage signal; and
the plurality of power sequence configurations includes a power sequence configuration specifying a sequence of switching on the first, second and third power supply voltage signals.

24. The method according to claim 21, wherein:
the plurality of power supply voltage signals includes a third power supply voltage signal; and
the plurality of power sequence configurations includes a power sequence configuration specifying the third power supply voltage signal should not be switched on.

25. The method of claim 22, comprising:
generating a configuration signal indicative of the selected power sequence configuration; and
generating control signals to sequentially switch on power supply voltage signals of the plurality of power supply voltage signals as a function of a configuration signal indicating the selected power sequence configuration.

26. The method of claim 25, wherein the control signals to sequentially switch on power supply voltage signals of the plurality of power supply voltage signals are generated as a function of:
a timer signal;
a first signal indicating whether the first power supply voltage signal is below a first threshold;
a second signal indicating whether the second power supply voltage signal is below a second threshold; or
various combinations thereof.

27. The method according to claim 25, comprising:
supplying a current to the resistance terminal; and
generating a digital sample of a voltage at the resistance terminal, wherein the control signals to sequentially switch on power supply voltage signals of the plurality of power supply voltage signal correspond to the digital sample or are generated as a function of the digital sample.

28. The method according to claim 27, wherein the generating the configuration signal comprises:
comparing the digital sample with a plurality of digital thresholds;
low-pass filtering the digital sample; or
combinations thereof.

29. A non-transitory computer-readable medium having contents which cause a system basis chip to perform a method, the method comprising:
generating, using power supply circuitry embedded into the system basis chip, a plurality of power supply voltage signals from an input voltage signal, the plurality of power supply voltage signals respectively supplying power to a power terminal of a plurality of power terminals of the system basis chip or to one or more functional circuits embedded in the system basis chip; and
controlling, using power sequence control circuitry embedded in the system basis chip, switching on of power supply voltage signals of the plurality of power supply voltage signals, wherein the controlling includes:
generating an indication of a value of a resistance; and
selecting one of a plurality of power sequence configurations based on the generated indication of the value of the resistance, the plurality of power sequence configurations including:
a first power sequence configuration in which a first power supply voltage signal of the plurality of power supply voltage signals is switched on before a second power supply voltage signal of the plurality of the power supply voltage signals; and
a second power sequence configuration in which the second power supply voltage signal is switched on before the first power supply voltage signal.

30. The non-transitory computer-readable medium of claim 29, wherein the method comprises:
sensing a value associated with a resistor coupled to a resistance terminal of the system basis chip; and
generating the indication of the value of the resistance based on the sensed value.

31. The non-transitory computer-readable medium of claim 29, wherein the contents comprise instructions executable by the power sequence control circuitry.

* * * * *